(12) United States Patent
Hosier et al.

(10) Patent No.: US 6,545,712 B1
(45) Date of Patent: Apr. 8, 2003

(54) PHOTOGATE IMAGE SENSOR WITH FAT ZERO INJECTION ON A MIDDLE NODE OF AN ASSOCIATED TRANSFER CIRCUIT

(75) Inventors: Paul A. Hosier, Rochester, NY (US); Scott L. Tewinkle, Ontario, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/213,515

(22) Filed: Dec. 17, 1998

(51) Int. Cl.[7] ............................ H04N 3/14; H04N 5/335
(52) U.S. Cl. ..................... 348/308; 348/302; 348/307
(58) Field of Search ............................. 348/302, 307, 348/308, 272, 281

(56) References Cited

U.S. PATENT DOCUMENTS

| 4,737,854 A | 4/1988 | Tandon et al. ......... 358/213.31 |
| 5,081,536 A | 1/1992 | Tandon et al. ......... 358/213.31 |
| 5,105,277 A | 4/1992 | Hayes et al. ........... 358/213.31 |
| 5,148,268 A | * 9/1992 | Tandon et al. ............... 348/280 |
| 5,543,838 A | * 8/1996 | Hosier et al. ................ 348/280 |
| 6,233,013 B1 | * 5/2001 | Hosier et al. ................ 348/272 |

OTHER PUBLICATIONS

Mendis et al., "CMOS Active Pixel Image Sensor", IEEE Transaction on Electron Devices, vol. 41, No. 3, Mar. 1994.

* cited by examiner

Primary Examiner—Wendy R. Garber
Assistant Examiner—Justin Misleh
(74) Attorney, Agent, or Firm—R. Hutter

(57) ABSTRACT

An electronic photosensitive apparatus, such as an image scanner in a digital copier, uses depleted-gate photosensors or photogates as the photosensitive elements therein. The linearity of the transfer circuit associated with each photogate or set of photogates is improved by placing a bias charge of predetermined magnitude on a phototransfer gate disposed downstream of the photogate prefatory to reading out an image signal from the photogate.

4 Claims, 2 Drawing Sheets

PHOTOGATE IMAGE SENSOR WITH FAT ZERO INJECTION ON A MIDDLE NODE OF AN ASSOCIATED TRANSFER CIRCUIT

INCORPORATION BY REFERENCE

U.S. Pat. No. 6,233,013, assigned to the assignee hereof, is hereby incorporated by reference.

FIELD OF THE INVENTION

The present invention relates to CMOS depleted-gate photosensors, or simply photogates. More specifically, the present invention relates to a system of transfer circuits by which a plurality of such photogates arranged in parallel can read out signals therefrom, such as in a full-color sensor array.

BACKGROUND OF THE INVENTION

Currently there are two prevalent basic technologies for image sensing with solid-state apparatus, such as in a television camera, digital still camera, or document scanner: the charge-coupled device, or CCD, and CMOS. These two technologies have respective practical advantages and disadvantages. Recently, however, there has become available a new sensor technology which is intended to preserve the advantages of either CCDs or CMOS. This technology is known as "CMOS active pixel image sensors" or "depleted-gate photosensors," or most simply "photogates." In brief, a small single-stage CCD is fabricated for each photosensor, and the output of the single CCD stage is integrated with CMOS circuitry, such as a transfer circuit. The basic technology of constructing such photogates is disclosed in Mendis, Kemeny, and Fossum, "CMOS Active Pixel Image Sensor," IEEE Transactions on Electron Devices, Volume 41, No. 3, March 1994.

The basic structure of a photogate-based photosensor is as follows. There is disposed in a silicon structure one doped area with an exposed surface, known as a photogate, which accepts light thereon. When the photogate is exposed to light, a charge is created in the depletion layer thereof. A transfer gate is disposed next to the photogate. When it is desired to transfer the charge from the photogate, a potential is applied to the transfer gate, thus deepening the potential well there. This deepening of the potential well in the transfer gate causes the charge in the photogate to spill into the transfer gate, according to the basic CCD method. This CCD-type charge transfer occurs only once in the process, and the charge spilled into the transfer gate is converted into a voltage with associated CMOS circuitry.

Although photogates have numerous advantages, such as small size, CMOS-compatibility and relative ease of fabrication, certain problems must still be addressed in order to incorporate this technology in, for example, a full-color document scanner. In one type of full-color document scanner, there are provided three separate linear arrays, each array incorporating a relatively large number of photosensors. Each separate linear array of photosensors, is filtered with one primary color filter, such as red, blue, and green. The three primary-color-filter linear arrays are then exposed to an original document moving past, to record video signals based on the exposed document. Because each individual linear array is filtered with one primary color, the ultimate output is three color separations based on the original image. One basic problem with using photogate technology as photosensors in this context is that, with currently-known designs of photogates, the integration time of each photogate, which is analogous to the shutter exposure time in a camera, is not readily controllable for individual pixels. This lack of direct control my cause problems with accurate recording of individual color separations with the arrays of photogates. The co-pending patent application referenced above describes a system by which photogates with independently-controllable integration times can be realized.

DESCRIPTION OF THE PRIOR ART

In the prior art, the article "CMOS Active Pixel Image Sensor," referenced above, sets forth the basic operating principle of photogates.

U.S. Pat. Nos. 4,737,854; 5,081,536; and 5,105,277 disclose methods of operating a transfer circuit in conjunction with a photodiode in a photosensor scanner. Various of the techniques described in these references involve injecting a "fat zero" bias charge on certain transistors of the transfer circuit, such as to cause one transistor in the transfer circuit to function as a metering gate, or to inject a fat zero on the photodiode itself, so that the response of the photodiode will be effectively highly linear. Significantly, each of these references is directed to the specific concerns of a photodiode, and is not directly relevant to transfer circuits for photogates, as in the claimed invention.

SUMMARY OF THE INVENTION

According to one aspect of the present invention, there is provided a photosensitive apparatus, and method of operating thereof. The apparatus comprises a first photogate, the first photogate creating a charge in response to light impinging thereon, and a first phototransfer gate associated with the first photogate, a charge in the first photogate spilling into the first phototransfer gate in response to an applied potential difference between the first photogate and the first phototransfer gate. The apparatus further comprises a second photogate, the second photogate creating a charge in response to light impinging thereon, and a second phototransfer gate associated with the second photogate, a charge in the second photogate spilling into the second phototransfer gate in response to an applied potential difference between the second photogate and the second phototransfer gate. A common node is associated with the first phototransfer gate and the second phototransfer gate, the common node being associated with an output line. A reset gate is disposed at a reset node on the output line, the reset gate adapted to selectably apply a predetermined reset potential to the reset node. A predetermined bias voltage is placed on the common node prefatory to causing a charge to pass from the common node to the reset node.

DETAILED DESCRIPTION OF THE INVENTION

In the following detailed description, certain conventions will be used in the various Figures, with like reference indices indicating like elements in different Figures; also, significantly, the letters which indicate a circuit element in a schematic will also refer to the potential on the circuit element in a timing diagram. First, the letters PG will represent a "photogate," while the letters PT will represent a transfer gate associated with a photogate; in order to distinguish a transfer gate immediately associated with a photogate from other transfer gates, the transfer gates immediately associated with photogates will be referred to below and in the claims as "phototransfer gates." The letter following either PG or PT will refer to the primary color which the particular element is supposed to be associated with, so that PGR will represent the red photogate, and PTG will represent the phototransfer gate associated with the green photogate, and so forth. PR represents a reset signal which will be applied on a reset node as shown, and PR2 represents the location of placing another reset, or "clearings" signal, as will be explained below. $V_R$ represents a reset voltage, and $V_{out}$ represents both the output line and an output voltage on the output line.

Figure 1:
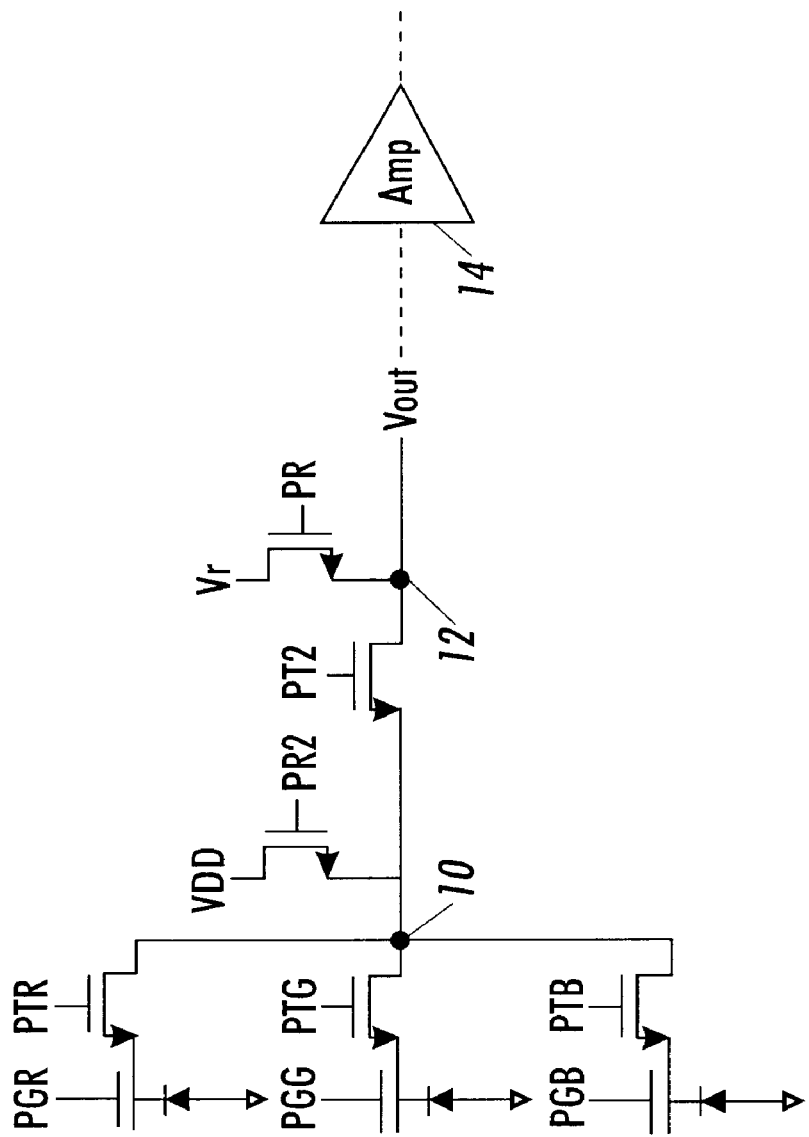
FIG. 1 is a schematic diagram of a pixel cell, comprising three primary-color-sensitive photogates, along with associated transfer circuitry, to be operated according to the present invention.

FIG. 1 is a schematic view of a pixel cell comprising three primary-color photosensors arranged in parallel relative to a transfer circuit, according to the present invention. Three photogates PGR, PGG, and PGB, each being filtered by a primary-color translucent filter (not shown), and associated with a phototransfer gate PTR, PTG, and PTB respectively, are connected in parallel to a common node indicated as 10. Downstream of the common node 10 is a reset gate PR, as well as a transfer gate PT2, and a second reset gate PR2 which selectably applies a predetermined "discharge voltage" VDD onto the common output line, as shown. Reset gate PR forms a reset node indicated as 12, through which a reset voltage Vr is applied to the transfer circuit as part of the reading out of signals from common node 10, as will be described in detail below. Also, as part of the reading out of signals, the various signals are at various times output from the transfer circuit as $V_{out}$ and caused to pass through an amplifier 14, in a manner generally described in the patents referenced above.

Further as noted in the patents referenced above, there will typically be disposed, such as on a single silicon chip, as many as 250 sets of primary-color photogates, each with a transfer circuit and amplifier as shown in FIG. 1. When image data recorded by the photogates is read out as image signals, a shift register or other processor (not shown) typically sequentially selects each of the transfer circuits to read out voltage signals at a given time onto a single output bus, and the voltage signals from the various photogates over time are thus assembled to form digital image data relating to the image being exposed.

Figure 2:
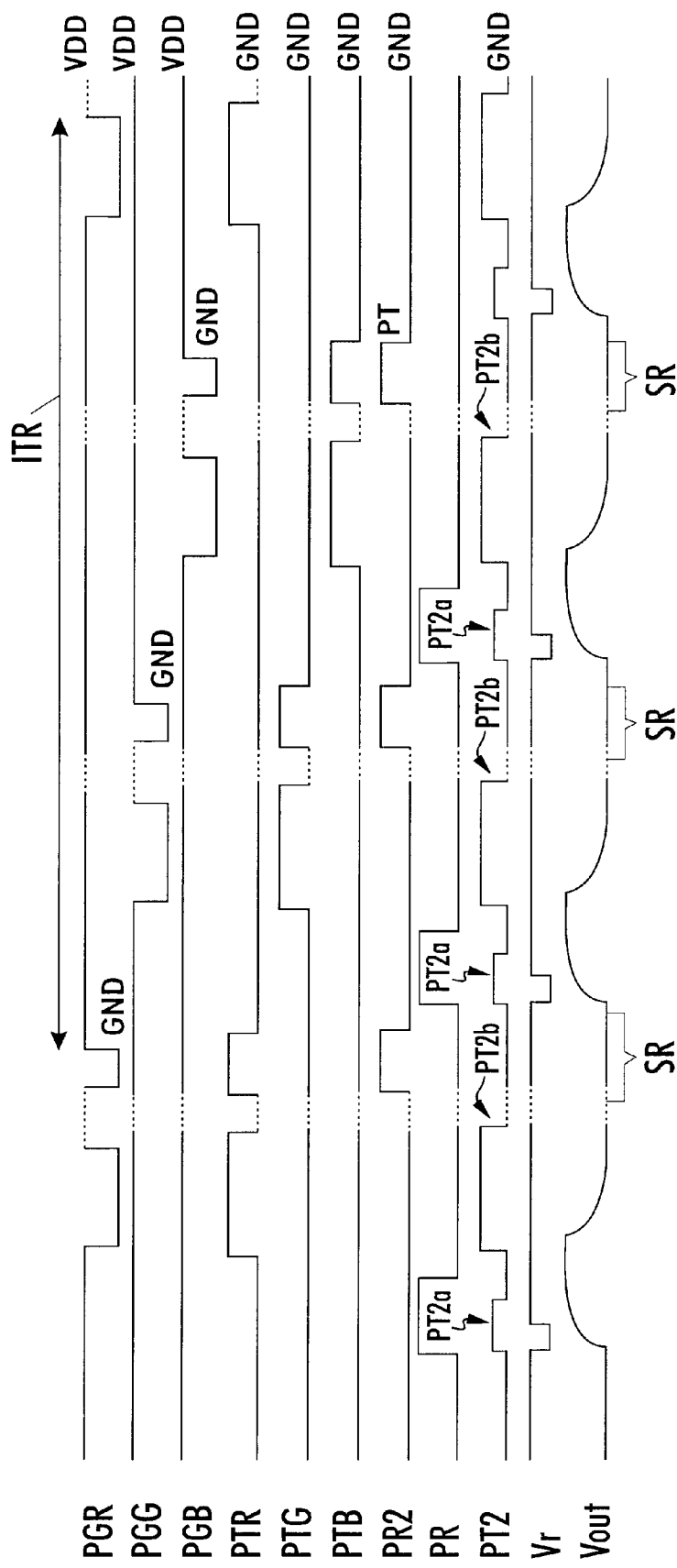
FIG. 2 is a timing diagram of potentials applied to various circuit elements in the schematic of FIG. 1, according to the method of the present invention.

FIG. 2 is a timing diagram showing the operation of the various circuit elements in reading out charges from the photogates. Looking at the top lines, PGR to PTB, in FIG. 2, a pattern can be seen that, in sequence, the potential on a photogate such as PGR is momentarily dropped, while simultaneously the potential on the phototransfer gate immediately associated with the photogate, such as PTR, is simultaneously raised from ground: in other words, during the drop in potential on the photogate, the potentials on the photogate and the phototransfer gate momentarily switch polarities, thus creating a potential difference therebetween. Moving across the top lines of FIG. 2, it can be seen that, first, the red photogate PGR and red phototransfer gate PTR switch polarities, then the green photogate PGG and green phototransfer gate PTG switch polarities, and then finally the blue photogate PGB and the blue phototransfer gate PTB switch polarities. With each polarity switch, there is a "spill" of whatever (image-related) charge happens to be on the photogate at the time, through the phototransfer gate and onto the common, or middle, node 10. In this way, the sequence of "spills" allows the image-related charges on the photogates PGR, PGG, and PGB to be sequentially read to the common node 10.

It will be noted that for each spill, such as with PGR and PTR, there are in effect two distinct switches in polarity, the second polarity switch occurring at some selectable predetermined time (indicated by the dotted lines in FIG. 2), following the first. Simultaneous with the second switch in potential, a signal on circuit element PR2 is set high. Referring back to FIG. 1, this pulse on PR2 provides a voltage gradient to a predetermined external voltage VDD (from a source, not shown) to the common node 10. When VDD is applied to the common node simultaneous with a spill of charge from the photogate to the phototransfer gate, all of the charge on the photogate such as PGR spills through the phototransfer gate PTR and through common node 10 and is drawn to VDD: as VDD is preferably a relatively high positive potential, it draws the negative charge from the photogate.

As described in the patent incorporated by reference above, the effect of applying the relatively high potential VDD during the spill is that any charge that had been accumulated on the photogate such as PGR up to that time is removed from the photogate. This "clearing" of a particular photogate at a particular time allows the integration time, during which charge is accumulated in the photogate as a result of light impinging thereon, to start at a precisely-controlled time, thereby allowing precise control of the effective exposure time of the photogate when the apparatus is, for example, scanning a color document. As shown in FIG. 2, the integration time of a particular photogate, such as ITR for the red photogate PGR, is effectively the time between the clearing of the photogate (caused by the application of voltage VDD by PR2) to the subsequent reading out of the charge on the photogate through the phototransfer gate, and the common node, and finally on the output line. This reading out of the charge on the photogate is initiated by a change in polarities relative to the phototransfer gate, as shown in FIG. 2, but during the spill, no pulse is applied to PR2. Instead, a series of pulses are applied as shown to reset gate PR and what is here simply called a transfer gate PT2.

As can be seen in FIG. 2, the initial pulse on reset gate PR occurs just before the spill between a photogate such as PGR and phototransfer gate such as PTR. The purpose of this initial pulse on PR is to apply a relatively low voltage Vr onto a reset node 12 on the output line. This setting of a relatively low potential on the reset node 12 is prefatory to applying a pulse on transfer gate PT2, which is in series with the output line, so that the charge on a photogate such as PGR can pass through transfer gate PT2 and toward the reset node 12.

With particular reference to the present invention, it has been found, with a combination of photogates (such as for different colors) in combination with a shared transfer circuit, such as shown in FIG. 1, that the transfer of signal-based charges from a particular phototransfer gate, such as PTR, through the transfer circuit may not be entirely linear. Typically, in a basic case where there is only one photogate and transfer gate per transfer circuit, the transfer is highly linear, especially when the transfer gate (such as PTR) is physically close to the photogate (such as PGR). However, if the capacitance of a middle node such as 10 in FIG. 1 is significant (as it is in the illustrated embodiment of three photogates sharing a common node 10), the transfer of charge from node 10 through PT2 will be non-linear. Node 10 would not exist for simple monochrome and color photogate configurations. However, the insertion of PT2 and PR2 are necessary for the configuration described in the copending patent application, and in these cases the capacitance associated with the common node 10 can be significant. The configuration including the PT2 transfer gate is needed for the case of where a full-color arrangement of three photogates PGR, PGG, PGB is operated in a monochrome mode, so that, for example, no signals would be read from the photogates PGR or PGB. Also, it is needed to operate a full-color photogate-based photosensor array in a manner in which individual-color-sensitive photogates are operated to have independently-controllable integration times.

In order to provide the desired linearity of charge transfers through the transfer circuit, the present invention provides for the injection of a "fat zero" bias charge of a predetermined amount on the middle phototransfer gate, shown in FIG. 1 as PT2. In brief, the "fat zero" is placed on phototransfer gate PT2 prefatory to readouts of signal-based charges from one or another photogate PGR, PGG, PGB. A phototransfer gate, such as PT2, will typically exhibit non-linearity at very low charges being passed therethrough; by placing a predetermined bias charge on PT2, the non-linear portions of the response curve of the phototransfer gate PT2 are taken out of consideration, so that the important signal-based charge being transferred through phototransfer gate PT2 is present only in a linear range of operation of the phototransfer gate. In short, placing of the "fat zero" bias on the phototransfer gate PT2 between readouts of signal-based charges ensures that the behavior of the phototransfer gate PT2 will be substantially linear.

It should be understood throughout this discussion that applying "fat zero" voltage to the gate of PT2 applies a corresponding fat zero (predetermined bias voltage) to the potential well associated with common node 10, aiding the charge transfer from that potential well. The bias thus placed on common node 10 may not be exactly equal to the bias placed on PT2, because of a device physics effect called the "body effect," but the important point is that the fat zero deliberately placed on phototransfer gate PT2 is a means toward the end of placing a predetermined bias on the common node 10, which is precisely what improves the linearity of the entire transfer circuit.

In order to facilitate the placement of a predetermined reference fat zero voltage on phototransfer gate PT2 before the transfer of a signal-based charge through the phototransfer gate PT2, the fat zero reference voltage can be placed via reset gate PR, in between readouts of individual color-based signals from photogates PGR, PGG, and PGB.

In FIG. 2, it can be seen that the voltage placed on phototransfer gate PT2 during the operation of the transfer circuit can be one of two levels, a relatively low level PT2$a$, followed by a pulse of a relatively higher level PT2$b$. The first pulse, PT2$a$, is placed on transfer gate PT2 when reset gate PR is causing the fixed reference voltage Vr to apply a potential onto reset node 12; the second pulse in each set, PT2$b$, occurs when reset gate PR is shut off and one or another phototransfer gate, PTR, PTG, or PTB, is causing a signal from its associated photogate to be loaded onto common node 10. During the period in which pulse PT2$a$ is applied to transfer gate PT2, the voltage on common node 10, $V_{CM}$ will be set equal to $V_{CM}=V_{PT2a}-V_{T(PT2)}$, where $V_{T(PT2)}$ is the transistor threshold of the CMOS transistor forming transfer gate PT2. As is well known, the transistor threshold of a CMOS transistor is defined as the required voltage that needs to be applied to cause the transfer gate to form a channel. Following the transfer of a particular signal-based charge through transfer gate PT2, the voltage on common node 10 $V_{CM}$ will be $V_{CM}=V_{PT2b}-V_{T(PT2)}$. The fat zero reference voltage which is placed on transfer gate PT2 is thus $V_{FZ}=V_{PT2a}-V_{PT2b}$.

In this particular embodiment, $V_{FZ}$ will be a negative voltage. This residual reference voltage placed on transfer gate PT2 for the duration of a transfer-signal based charge through the transfer gate PT2 is just enough to "prime" the transfer gate PT2 so that the transfer gate PT2 will operate in a linear portion of its functional range when an image-based signal charge is read out from a photogate through the circuit. Because the transfer gate PT2 will be operating only within the linear portion of its functional range, the overall response of the transfer circuit shared by the three photogates PGR, PGG, PGB will be substantially linear, with its attendant advantages of signal-to-noise ratio.

As can be seen by dotted lines in the various signals shown in FIG. 2, the clearing of a particular photogate can occur at any selectable time following the output of the photogate onto the output line $V_{out}$. The integration time can thus be controlled by controlling when the "clearing" occurs. When the three photogate such as shown in FIG. 1 are used as a single "cell" in a large array of photosensors, such as in a document scanner, the period between the spill of charge from the photogate onto $V_{out}$, and the subsequent clearing, indicated in FIG. 2 as SR, can be used for momentary holding of the charge from a particular photogate as a potential on $V_{out}$ until the cell is read out, for example, by a stage in a shift register (not shown). The time proportions of a practical embodiment of the present invention are not shown to scale in FIG. 2: in one practical system, the duration of each instance of SR, where the dotted lines are present in FIG. 2, is on the order of 128 clock pulses, while the duration between instances of SR is typically about 32 clock pulses.

With reference to the claims, any "means" for applying any signal or potential to any circuit element will preferably be in the form of a digital control operating the circuit elements according to recited manner, and such general-purpose digital control systems are well known in the art.

While the invention has been described with reference to the structure disclosed, it is not confined to the details set forth, but is intended to cover such modifications or changes as may come within the scope of the following claims.

What is claimed is:

1. A photosensitive apparatus comprising:
    a first photogate, the first photogate creating a charge in response to light impinging thereon, and a first phototransfer gate associated with the first photogate, a charge in the first photogate spilling into the first phototransfer gate in response to an applied potential difference between the first photogate and the first phototransfer gate;
    a second photogate, the second photogate creating a charge in response to light impinging thereon, and a second phototransfer gate associated with the second photogate, a charge in the second photogate spilling into the second phototransfer gate in response to an applied potential difference between the second photogate and the second phototransfer gate;
    a common node associated with the first phototransfer gate and the second phototransfer gate, the common node being associated with an output line;

a reset gate disposed at a reset node on the output line, the reset gate adapted to selectably apply a predetermined reset potential to the reset node;

means for placing a predetermined bias voltage on the common node prefatory to causing a charge to pass from the common node to the reset node;

a middle phototransfer gate disposed in series between the common node and the reset node; and wherein the means for placing a predetermined bias voltage on the common node includes means for placing a predetermined bias charge on the middle phototransfer gate and the means for placing a predetermined bias voltage on the middle phototransfer gate includes (a) means for placing a first voltage pulse, of a first predetermined magnitude, on the middle phototransfer gate when the reset potential is being applied to the reset node; and (b) means for placing a second voltage pulse, of a second predetermined magnitude greater than the first predetermined magnitude, on the middle phototransfer gate when one of the first or second phototransfer gate is causing a signal from one of the first or second photogate to be loaded onto the common node.

2. The apparatus of claim 1, wherein the first phototransfer gate is adapted to receive light of a first wavelength range and the second first phototransfer gate is adapted to receive light of a second wavelength range.

3. In a photosensitive apparatus comprising:

a first photogate, the first photogate creating a charge in response to light impinging thereon, and a first phototransfer gate associated with the first photogate, a charge in the first photogate spilling into the first transfer gate in response to an applied potential difference between the first photogate and the first phototransfer gate;

a second photogate, the second photogate creating a charge in response to light impinging thereon, and a second phototransfer gate associated with the second photogate, a charge in the second photogate spilling into the second transfer gate in response to an applied potential difference between the second photogate and the second phototransfer gate;

a common node associated with the first phototransfer gate and the second phototransfer gate, the common node being associated with an output line; and a reset gate disposed at a reset node on the output line, the reset gate adapted to selectably apply a predetermined reset potential to the reset node; and a middle phototransfer gate disposed in series between the common node and the reset node;

a method of operating the apparatus, comprising the steps of:

placing a predetermined bias voltage on the common node prefatory to causing a charge to pass from the common node to the reset node, wherein the step of placing a predetermined bias voltage on the middle phototransfer gate includes placing a first voltage pulse, of a first predetermined magnitude, on the middle phototransfer gate when the reset potential is being applied to the reset node; and placing a second voltage pulse, of a second predetermined magnitude greater than the first predetermined magnitude, on the middle phototransfer gate when one of the first or second phototransfer gate is causing a signal from one of the first or second photogate to be loaded onto the common node.

4. The method of claim 3, wherein the first phototransfer gate is adapted to receive light of a first wavelength range and the second first phototransfer gate is adapted to receive light of a second wavelength range.

* * * * *